A. B. PROAL, Jr.
CONVEYING AND SORTING DEVICE.
APPLICATION FILED DEC. 5, 1911.

1,046,853.

Patented Dec. 10, 1912.

3 SHEETS—SHEET 1.

WITNESSES:
A. Pechurer
E. P. LaGay

Arthur Bruce Proal Jr. INVENTOR

BY
Binney & Mastick ATTORNEYS

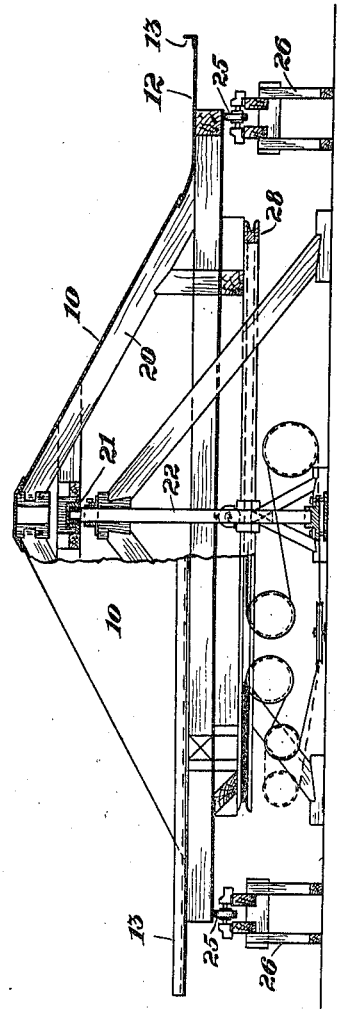
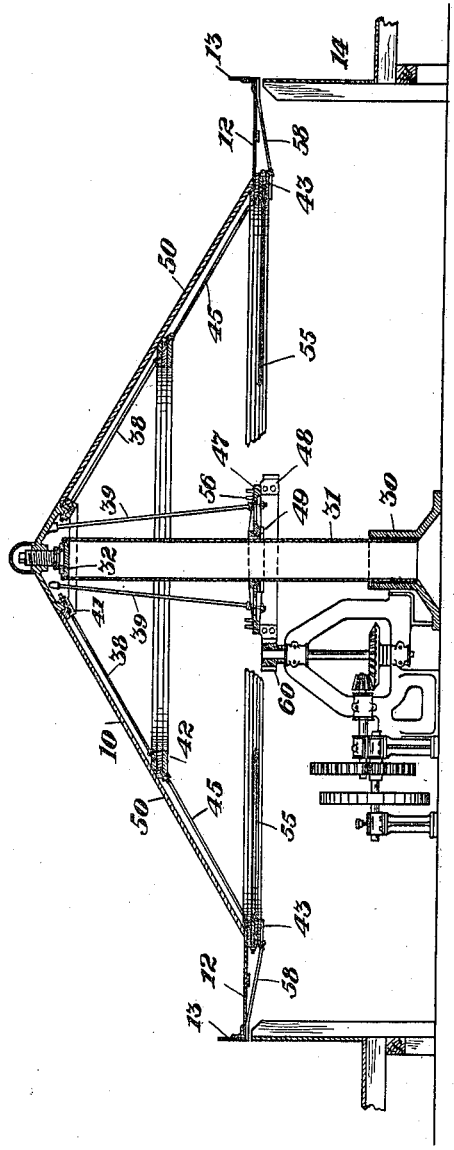

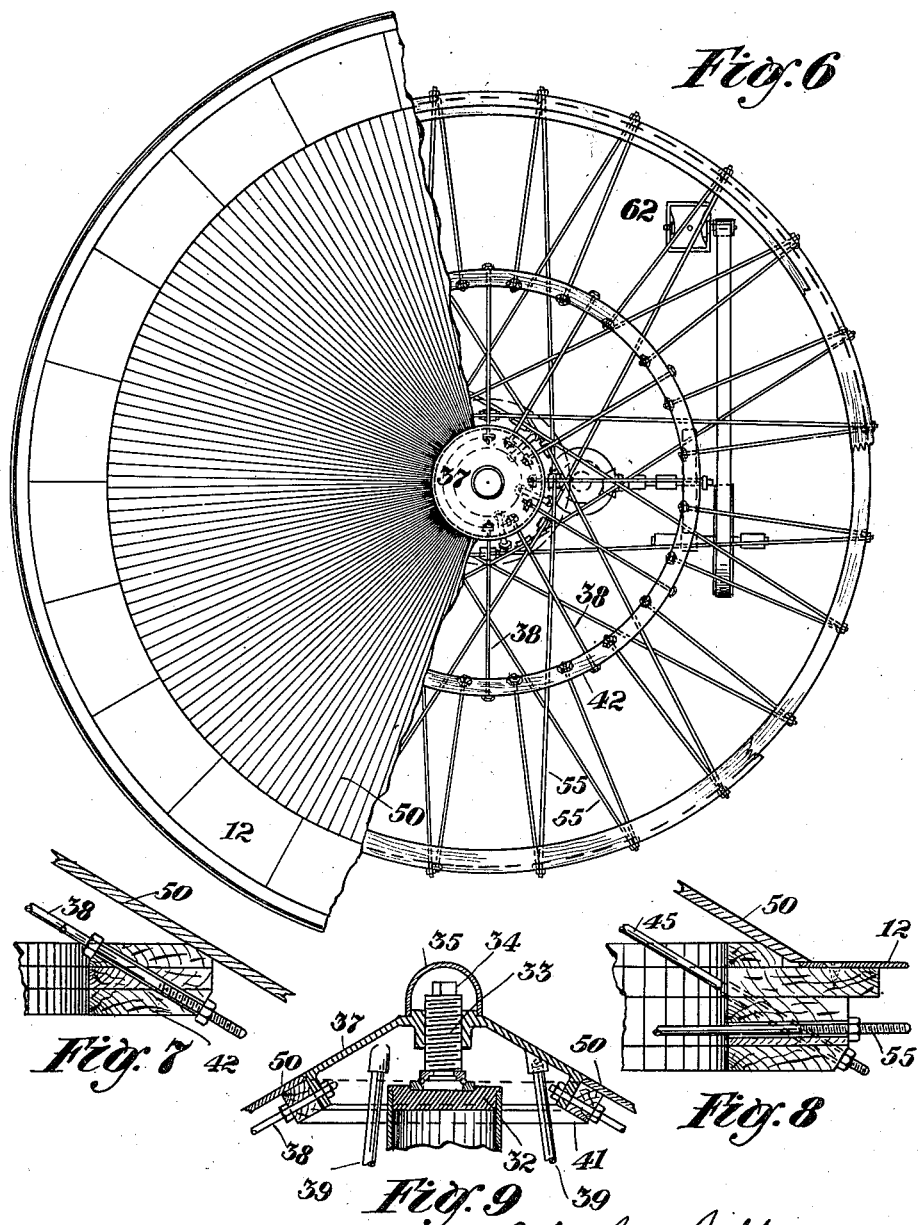

of the page # UNITED STATES PATENT OFFICE.

ARTHUR BREESE PROAL, JR., OF NUTLEY, NEW JERSEY, ASSIGNOR TO ROBINS CONVEYING BELT COMPANY, OF NEW YORK, N. Y., A CORPORATION OF NEW JERSEY.

CONVEYING AND SORTING DEVICE.

1,046,853.   Specification of Letters Patent.   Patented Dec. 10, 1912.

Application filed December 5, 1911. Serial No. 664,087.

*To all whom it may concern:*

Be it known that I, ARTHUR BREESE PROAL, Jr., a citizen of the United States, and a resident of Nutley, in the State of New Jersey, post-office address Robins Conveying Belt Company, 13 Park Row, New York, N. Y., have invented certain new and useful Improvements in Conveying and Sorting Devices, of which the following is a specification, accompanied by drawings.

The invention is particularly designed for the conveying and sorting of express matter, mail matter and packages in a quick and economical manner, and is particularly useful for the conveyance of packages to a central point and there sorting and distributing them among a plurality of bins, receptacles or receiving points.

Figure 1:
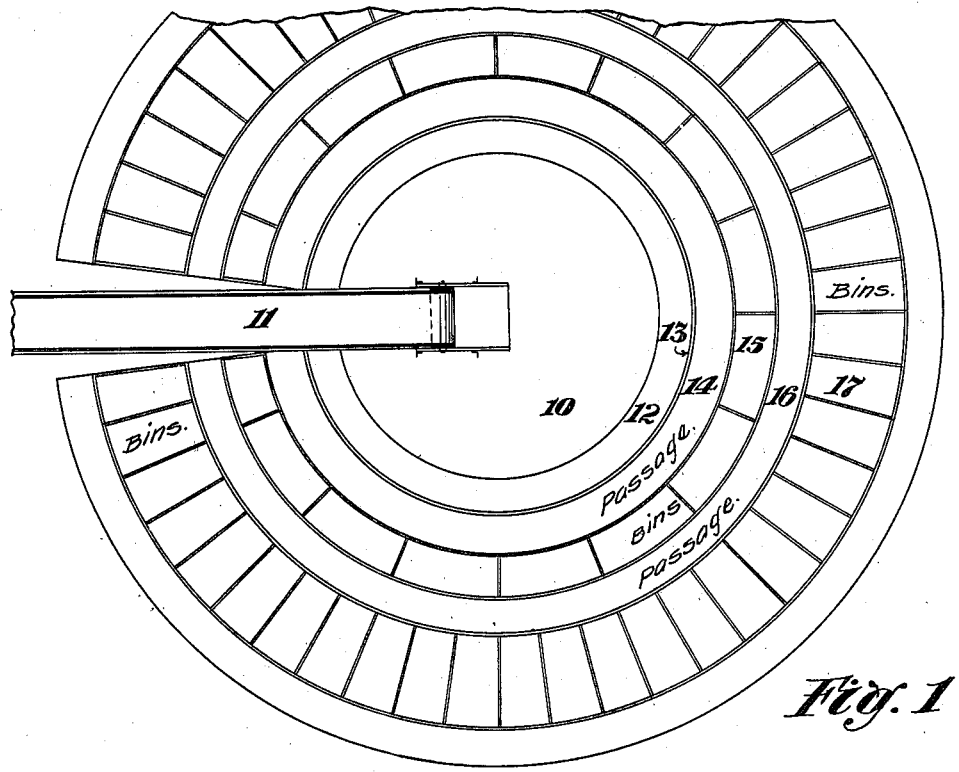
Figure 2:
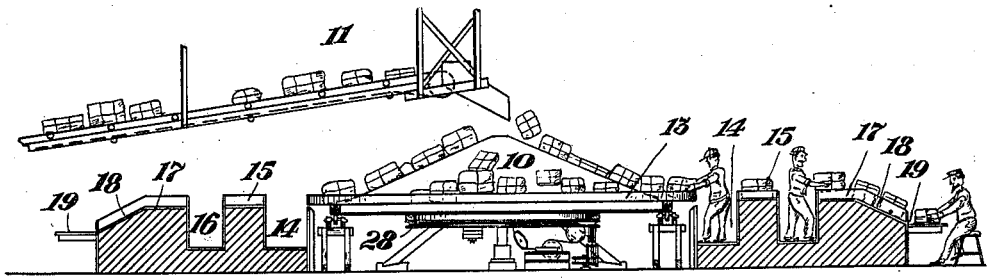
Figure 3:
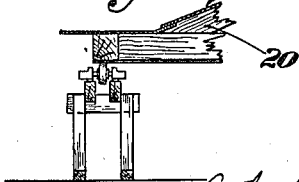

Figure 1 is a plan view, partly diagrammatic, of one form of the conveying and sorting device. Fig. 2 is a side view of the same, partly in section. Fig. 3 is a larger detail view of part of the same. Fig. 4 is a view, partly in section, of a portion of Fig. 2. Fig. 5 is a sectional view of a preferred form of part of the apparatus. Fig. 6 is a plan view of the same partly broken away and with some parts omitted. Figs. 7, 8 and 9 are vertical sectional details thereof.

A rotatory conveyer is employed having an inner conical surface 10 inclined toward the periphery sufficienty to cause the articles falling thereon to be fed by gravity toward the periphery thereof. By conical I do not mean to exclude pyramidal and other forms inclined outwardly for the same purpose. A conveyer 11 brings the articles to be sorted and delivers them to the upper portion of the rotatory conveyer, as shown. At the foot of the inclined surface 10 is a horizontal carrying surface 12 surrounded by a peripheral flange 13. The horizontal surface 12 allows a considerable quantity of the packages or articles to accumulate upon it and go around and around until removed. Flange 13 serves to prevent such articles slipping off or being crowded off and to arrest the descent of the articles even if they are allowed to accumulate upon the inclined portion when the peripheral portion is occupied. Around the rotatory conveyer is a passage or interval 14 in which the operatives may stand. Horizontal portion 12 is arranged at about the height of a table relative to the floor of the passage 14. Around the passage 14 are a plurality of bins, receptacles or receiving points 15. These in turn may be surrounded by a second passageway 16 and receptacles 17. Preferably receptacles 17 are inclined outward, as at 18 (Fig. 2), so as to deliver the articles by gravity therefrom to platform 19.

It will be seen that the articles coming along the conveyer 11 drop on to the rotatory conveyer and descend adjacent to its periphery, where they are carried around and around until taken off by the operatives, and as they travel past the operatives articles can be selected by their label or other suitable indication and merely transferred across to the appropriate bin or receptacle 15, thus becoming sorted and distributed in a very easy manner, and being further sorted, if desired, by the operatives in the outer passage, if such is present.

In Figs. 1 to 4, inclusive, the inclined portion 10 is carried on a suitable wooden framing 20, which is hung on an end bearing 21 on upright supporting post 22. Beneath the peripheral portions of the frame a plurality of guide rollers 25, supported on suitable framing 26, are so placed as to maintain the rotatory conveyer level, but substantially the entire weight should preferably rest upon the end bearing 21. Beneath the framing 20 is secured the grooved rope wheel 28, which is driven by a rope suitably actuated and running over guide pulleys and take-up pulleys, as will be understood without detailed description. These are indicated in Figs. 2 and 4. The horizontal peripheral surface 12 of the conveyer may be conveniently made of sheet metal secured to the framing, and the peripheral flange 13 may be made of angle iron, as seen in Fig. 4.

In Figs. 5 to 9, inclusive, a very light and effective construction of the rotatory conveyer is illustrated, in which adjustable tie rods are used combined with wooden rings which may be very conveniently leveled up and made true in erecting the apparatus. In a suitable base 30 is set the upright iron post 31, and secured therein by a rust-joint or otherwise. On the head 32 of this post, as seen in Fig. 9, are carried ball bearings on which the rotatory conveyer is hung. In order to provide slight vertical adjustment upon this bearing, so as to suitably adjust and relieve the weight of the leveling or laterally supporting bearings of the apparatus, the bearing members, which turn with the head of the rotatory conveyer, are provided with an adjusting screw 33 having square head 34 under the loose cap 35. By turning this screw the conveyer may be vertically adjusted slightly and accurately upon its end bearing on the head of the post. The upper part of the conveyer is provided with a casting 37, to which are hung two sets of rods 38 and 39. The rods 38 extend parallel with the inclined surface of the conveyer, and upon their lower ends is hung the ring 42, preferably of laminated wood. At 41 is secured the upper wooden ring for fastening the upper ends of the wooden facing strips 50, which form the inclined wearing surface of the conveyer. By a slight adjustment of the nuts on the bolt rods 38, the ring 42 is easily adjusted so as to be exactly concentric with its axis of rotation and level. Near the lower edge of the inclined surface a wooden ring 43 is hung to ring 41 by a plurality of tie rods or bolts 45, which by slight adjustment enable the ring 43 to be readily made concentric with ring 42 and the axis and true. The tie rods or tie bolts 39 extend down and support a split casting 47, which carries the split gear 48, and which turns on ball bearings, as indicated at 49, on the post 31. By a slight adjustment of the tie bolts 39 the casting 47 and gear 48 are leveled. A plurality of tie rods or tie bolts 55 extends from the lugs 56 on the casting 47 to the outer wooden rim 43, and by adjusting these the outer ring 43 is made exactly concentric with the gear wheel 48 and post. The outer horizontal portion 12 of the conveying surface is secured to ring 43. Braces 58 may be placed beneath to stiffen the support of this horizontal portion. Wooden strips 50, forming the inclined surface 10, are secured to the rings 41, 42, 43, and finished smoothly, as will be understood. The gear wheel 48 is driven by pinion 60 and suitable gearing, as shown, preferably from an electric motor placed beneath the framing, as seen at 62 (Fig. 6). It will be seen that a very light, easily constructed and easily alined and adjusted frame for the rotatory conveyer is thus produced. It will also be manifest that very considerable variations in the design of the apparatus described may be permitted without varying the principle of operation of the invention.

I claim the following:

1. In a conveying and sorting device the combination of a rotatory conveyer having an inner carrying portion, the surface of which is inclined outward toward its periphery for causing an outward feed of articles, and having an outer carrying portion for arresting such articles, a plurality of receptacles set around the said conveyer, a floor forming a passage or interval for operatives between the said conveyer and the said receptacles, and a conveyer for delivering articles to the said inner portion of the rotatory conveyer.

2. In a conveying and sorting device the combination of a rotatory conveyer turning on a vertical axis and having an annular conveying surface inclined outward, and a conveyer delivering to the upper portion of such inclined surface.

3. In a conveying and sorting device, a rotatory conveyer turning on a vertical axis and having an annular conveying surface inclined outward, and a peripheral upturned flange for preventing articles falling off, and means for delivering articles onto the inclined surface.

4. In a conveying and sorting device, a rotatory conveyer turning on a vertical axis and having an annular conveying surface inclined outward, and an outer carrying surface adapted to carry articles at rest at the foot of the incline, and means for delivering articles onto the inclined surface.

5. In a conveying and sorting device, a rotatory conveyer turning on a vertical axis and having an annular conveying surface inclined outward, and an outer carrying surface adapted to carry articles at rest at the foot of the incline, and an upturned peripheral flange, and means for delivering articles onto the inclined surface.

6. In a conveying and sorting device, a rotatory conveyer turning on a vertical axis and having an annular conveying surface inclined outward, and having means for carrying articles at the foot of the inclined surface, and a plurality of receptacles set around the said conveyer leaving space for operatives at the periphery of the conveyer.

7. In a conveying and sorting device, a rotatory conveyer turning on a vertical axis and comprising a frame having an end bearing on which it turns, one or more bearings for maintaining the conveyer level, an inclined carrying portion secured upon the said frame, and means for supporting articles at the foot of the inclined portion also secured upon the said frame, and means for delivering articles onto the inclined surface.

8. In combination, a rotatory conveyer turning on a vertical axis and having a conveying surface inclined outward, a passageway for operatives adjacent to the periphery of the said conveyer, and a receptacle beyond
5 and adjacent to the said passageway.

In testimony whereof I have signed this specification in the presence of two subscribing witnesses this fourth day of December, 1911.

ARTHUR BREESE PROAL, Jr.

Witnesses:
  HERMAN GOLDMAN,
  THOS. M. KEITH.